(12) United States Patent
Takahashi et al.

(10) Patent No.: US 10,112,444 B2
(45) Date of Patent: Oct. 30, 2018

(54) WEAR AMOUNT DETECTION DEVICE FOR AUTOMOBILE TIRES

(71) Applicant: NTN CORPORATION, Osaka (JP)

(72) Inventors: Toru Takahashi, Iwata (JP); Kentaro Nishikawa, Iwata (JP); Nobuo Masaki, Yokohama (JP); Yasumichi Wakao, Kodaira (JP)

(73) Assignee: NTN CORPORATION, Osaka (JP)

( * ) Notice: Subject to any disclaimer, the term of this patent is extended or adjusted under 35 U.S.C. 154(b) by 182 days.

(21) Appl. No.: 15/151,000

(22) Filed: May 10, 2016

(65) Prior Publication Data

US 2016/0250899 A1 Sep. 1, 2016

Related U.S. Application Data

(63) Continuation of application No. PCT/JP2014/080201, filed on Nov. 14, 2014.

(30) Foreign Application Priority Data

Nov. 21, 2013 (JP) ................. 2013-241125

(51) Int. Cl.
  *B60C 11/24* (2006.01)
  *G01M 17/02* (2006.01)
  *B60C 19/00* (2006.01)

(52) U.S. Cl.
  CPC ............ *B60C 11/246* (2013.01); *B60C 19/00* (2013.01); *G01M 17/02* (2013.01); *B60C 11/24* (2013.01); *B60C 2019/004* (2013.01)

(58) Field of Classification Search
  CPC ....... B60C 11/24; B60C 11/246; B60C 19/00; B60C 2019/004; B60C 23/06; B60C 23/061; B60C 23/062; G01M 17/02; G01P 3/443; G01P 3/487; G01P 13/04; G01P 3/446; G01P 3/489; B60T 8/1725; Y10T 152/10027
  See application file for complete search history.

(56) References Cited

U.S. PATENT DOCUMENTS

| 6,076,035 A | * | 6/2000 | Yanase | .................... B60C 11/24 |
| | | | | 701/80 |
| 6,266,602 B1 | * | 7/2001 | Yamaura | ................. B60T 8/172 |
| | | | | 303/112 |

(Continued)

FOREIGN PATENT DOCUMENTS

| CN | 1468740 A | 1/2004 |
| EP | 1031442 A2 | 8/2000 |

(Continued)

OTHER PUBLICATIONS

Extended European Search report dated Jun. 28, 2017 in corresponding European Patent Application No. 14863813.3.

(Continued)

*Primary Examiner* — Randy Gibson
*Assistant Examiner* — Gedeon M Kidanu

(57) ABSTRACT

A wear amount detection device to detect that a tire is in a worn state, during running, without a special sensor. The device includes a rotation sensor detecting rotation of a wheel to measure a speed of an automobile; a signal processing extracting rotation speed fluctuations synchronized with rotation, from a rotation signal detected by the rotation sensor, and obtain a rotation speed fluctuation pattern synchronized with rotation, from rotation speed fluctuations over a plurality of rotations; and a wear state determination configured to obtain, from the obtained pattern, a value of a component induced by a characteristic embodied in a tire of the wheel, the value varying in accordance with a wear state of the tire, to estimate a wear state of the tire, and to output the state.

14 Claims, 16 Drawing Sheets

(56) References Cited

U.S. PATENT DOCUMENTS

| | | | |
|---|---|---|---|
| 6,591,668 B1* | 7/2003 | Becherer | B60C 23/06 |
| | | | 73/146 |
| 6,711,505 B2* | 3/2004 | Nakao | B60C 23/061 |
| | | | 702/145 |
| 6,778,893 B2 | 8/2004 | Murakami et al. | |
| 6,912,896 B2 | 7/2005 | Levy et al. | |
| 7,138,910 B2* | 11/2006 | Ogawa | B60C 23/0408 |
| | | | 340/442 |
| 7,277,816 B2 | 10/2007 | Kanekawa et al. | |
| 7,291,237 B2 | 11/2007 | O'Brien et al. | |
| 7,673,504 B2* | 3/2010 | Matsuda | B60T 8/1725 |
| | | | 340/442 |
| 7,923,993 B2 | 4/2011 | Takahashi et al. | |
| 8,061,191 B2* | 11/2011 | Hanatsuka | B60C 11/24 |
| | | | 702/34 |
| 8,371,159 B2 | 2/2013 | Morinaga | |
| 8,892,298 B2 | 11/2014 | Paturle et al. | |
| 9,234,908 B2 | 1/2016 | Shibata et al. | |
| 2002/0032511 A1 | 3/2002 | Murakami et al. | |
| 2004/0049303 A1 | 3/2004 | Levy et al. | |
| 2006/0069523 A1* | 3/2006 | Kanekawa | B60T 8/1725 |
| | | | 702/84 |
| 2006/0213593 A1 | 9/2006 | O'Brien et al. | |
| 2008/0017288 A1 | 1/2008 | O'Brien et al. | |
| 2009/0315544 A1 | 12/2009 | Takahashi et al. | |
| 2010/0186492 A1 | 7/2010 | Morinaga | |
| 2012/0086440 A1 | 4/2012 | Shibata et al. | |
| 2014/0277929 A1 | 9/2014 | Paturle et al. | |

FOREIGN PATENT DOCUMENTS

| | | |
|---|---|---|
| EP | 2 172 759 A1 | 4/2010 |
| JP | 2000-255230 | 9/2000 |
| JP | 2002-173954 | 6/2002 |
| JP | 2005-28950 | 2/2005 |
| JP | 2005-170065 | 6/2005 |
| JP | 2005-186702 | 7/2005 |
| JP | 2006-126164 | 5/2006 |
| JP | 2006-131137 | 5/2006 |
| JP | 2006-224757 | 8/2006 |
| JP | 2006-327368 | 12/2006 |
| JP | 2008-534355 | 8/2008 |
| JP | 2008-232426 | 10/2008 |
| JP | 2010-285123 | 12/2010 |
| JP | 2011-2357 | 1/2011 |
| JP | 2011-53027 | 3/2011 |
| WO | WO 2010/147004 A1 | 12/2010 |
| WO | 2013/050710 A1 | 4/2013 |

OTHER PUBLICATIONS

Chinese Office Action dated Jun. 20, 2017 in corresponding Chinese Patent application No. 201480062756.7.

Japanese Decision of Grant dated Sep. 26, 2017 in corresponding Japanese Patent Application No. 2013-241125.

International Preliminary Report on Patentability dated Jun. 2, 2016 in corresponding International Patent Application No. PCT/JP2014/080201.

International Search Report dated Jan. 13, 2015 in corresponding International Application No. PCT/JP2014/080201.

Chinese Office Action dated Jan. 16, 2017 in corresponding Chinese Patent Application No. 201480062756.7.

* cited by examiner

Fig. 9
(a) 20km/h
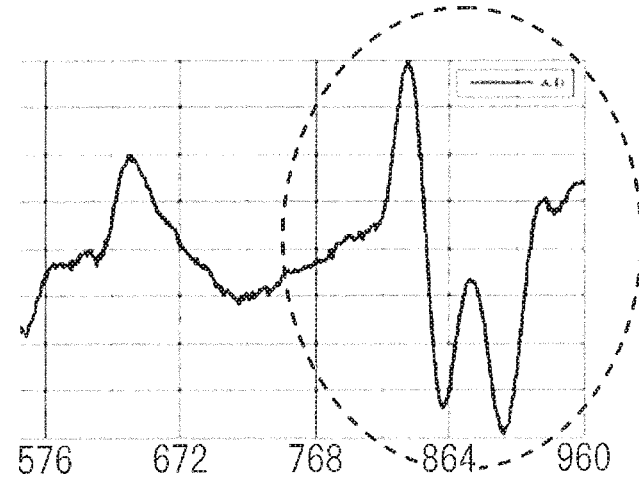
(b) 30km/h
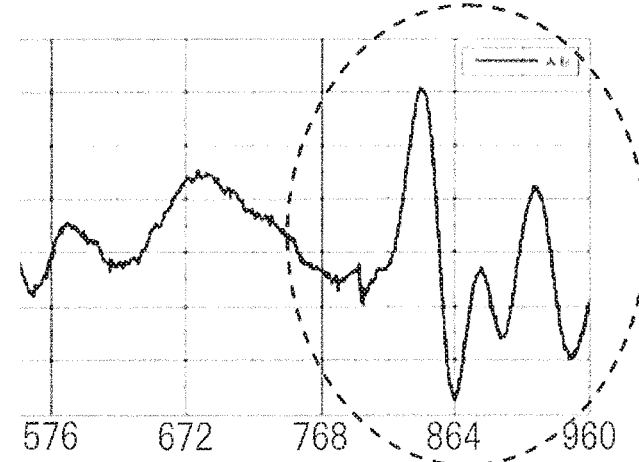
(c) 40km/h
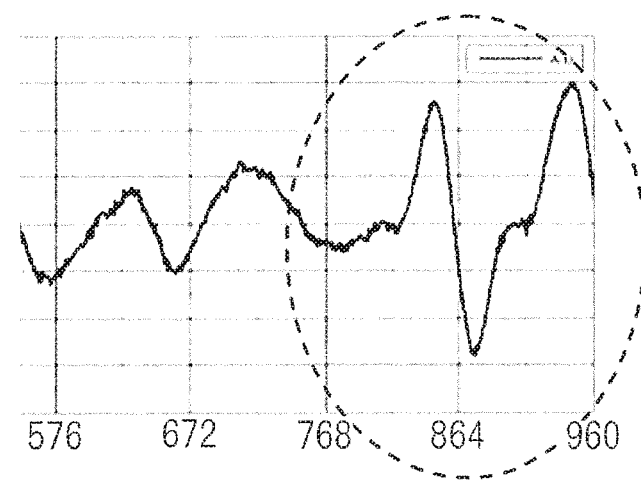

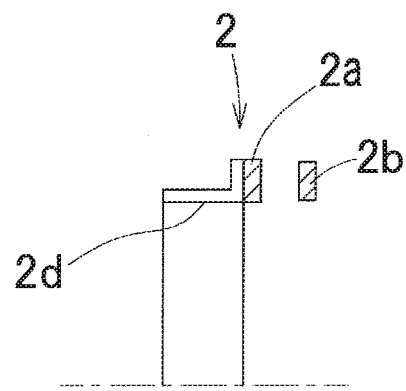
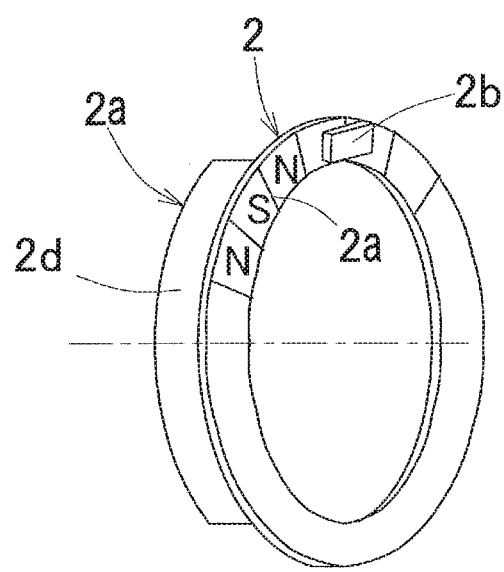

WEAR AMOUNT DETECTION DEVICE FOR AUTOMOBILE TIRES

CROSS REFERENCE TO THE RELATED APPLICATION

This application is a continuation application, under 35 U.S.C. § 111(a), of international application No. PCT/JP2014/080201, filed Nov. 14, 2014, which claims Convention priority to Japanese patent application No. 2013-241125, filed Nov. 21, 2013, the entire disclosure of which is herein incorporated by reference as a part of this application.

BACKGROUND OF THE INVENTION

Field of the Invention

The present invention relates to a wear amount detection device for an automobile tire that detects a wear state of a tire of an automobile during running, and relates to a technique to issue a warning regarding safety to a driver or notify the driver of arrival of a time to replace a tire.

Description of Related Art

Patent Document 1 discloses a device in which a conductive rubber resistor is embedded in a tread element, a signal of a change in resistance value caused by the resistor being removed due to wear is transmitted, and a wear state is determined through processing of the received detection signal.

Patent Document 2 discloses a method in which block rows of a tread element is formed to have a cross-sectional shape in which the number of blocks in a circumferential direction changes along with wear of a tire, vibration of a member disposed below a spring is detected, and the frequency of a rotation synchronous component is analyzed, thereby estimating a level of wear.

Patent Document 3 discloses a method in which recesses having different depths are formed so as to be arranged periodically along the circumferential direction of a tire, a vibration component caused due to the recesses is extracted from a vibration signal of a member below a spring, and a wear state is estimated on the basis of the magnitude of the vibration component.

Patent Document 4 discloses a high-resolution rotation detection device that is mounted on a wheel bearing of an automobile and provided with a function to multiply a signal.

Patent Document 5 discloses a rotation detection device that is mounted on a wheel bearing of an automobile and capable of detecting an absolute angle.

Patent Document 6 discloses a method for estimating a slip ratio or the like from a rotation sensor signal of a tire, and also discloses a method for averaging and detecting rotation synchronous components from a rotation signal of a tire over several rotations.

RELATED DOCUMENT

Patent Document

[Patent Document 1] JP Laid-open Patent Publication No. 2005-028950
[Patent Document 2] JP Laid-open Patent Publication No. 2005-186702
[Patent Document 3] JP Laid-open Patent Publication No. 2011-053027
[Patent Document 4] JP Laid-open Patent Publication No. 2011-002357
[Patent Document 5] JP Laid-open Patent Publication No. 2008-232426
[Patent Document 6] JP Laid-open Patent Publication No. 2006-126164

SUMMARY OF THE INVENTION

During running with a tire in which the level of wear is deep, in rainy weather, for example, a slip easily occurs and a hydroplaning phenomenon also easily occurs, so that the risk increases. In order to prevent this, it is recommended to check exposure of a slip sign provided in a tread groove of a tire and confirm whether the depth of the groove has been small.

However, if an exposure state of the slip sign is visually checked, it is difficult for an end user to determine the state in some cases. Unless the exposure state is periodically checked, there would be a possibility that exposure of the slip sign is overlooked. Similarly to this, when a platform indicating a wear amount at a groove in a studless tire is visually confirmed, it may not be noticed that the tire is in a worn state. Thus, there would be a possibility of running in a state where an anti-slip effect has diminished.

Although a method of embedding a sensor in a tire and directly detecting a wear state as in Patent Document 1 has been proposed, a method of transferring a signal from the tire to a vehicle body, and the durability of the sensor are problems. Thus, it is desired to be able to detect a wear state without providing a sensor in a tire.

A method for detecting a wear state by analyzing a signal of a vibration sensor mounted on a knuckle or the like as in Patent Document 2 or 3 does not have the problem in the case of transferring a signal from the tire to the vehicle body as in Patent Document 1, but requires a vibration sensor and a transfer circuit and an amplifier circuit for an analog signal in addition to ordinary equipment, so that the cost increases.

For the respective conventional proposals described above, it is desired to allow for detecting that a tire is in a worn state, without providing a special sensor and without greatly increasing the cost, and notifying a driver that tire replacement is required, thereby preventing an accident due to running in an unsafe state. In particular, for an electric vehicle or the like that does not require refueling, opportunities of confirming a state of a tire by a service man at a gas station or the like reduce. Thus, it is desired to automatically detect a wear state and call a driver's attention.

An object of the present invention is to provide a wear amount detection device for automobile tires that is able to detect that a tire is in a worn state, during running, without providing a special sensor, while suppressing an increase in cost, and that allows for notifying a driver that tire replacement is required, to allow an accident due to running in an unsafe state to be prevented.

Hereinafter, in order to facilitate understanding of the present invention, the present invention will be described with reference to the reference numerals in embodiments for the sake of convenience.

A wear amount detection device for a tire 1a of an automobile according to one aspect of the present invention includes: a rotation sensor 2 configured to detect a rotation signal of a wheel 1 so as to measure a speed of the automobile; a signal processing unit 3 configured to extract rotation speed fluctuations synchronized with the rotation, from the rotation signal detected by the rotation sensor 2, and obtain, from the extracted rotation speed fluctuations, rotation speed fluctuation patterns over a plurality of rotations, each of the rotation speed fluctuation patterns including a rotation speed fluctuation synchronized with the corresponding rotation; and a wear state determination unit 4 configured to: determine, in the obtained rotation speed fluctuation patterns, a component value induced by a characteristic embodied in the tire 1a, the component value varying in accordance with a wear state of the tire; estimate a wear state of the tire 1a on the basis of the determined component value; and output wear information (information regarding the estimated wear state).

The rotation speed fluctuation synchronized with rotation occurs as the tire 1a rolls on a road surface.

In signal processing, the rotation speed fluctuation patterns over a plurality of rotations are obtained from the rotation speed fluctuations. Rotation speed fluctuations for only one rotation would be influenced by irregularities of a road surface or the like. However, rotation speed fluctuation patterns from which the influence of the irregularities of the road surface is eliminated are obtained by collecting a rotation signal in a period over a certain number of times of rotations and performing an averaging process or an integration process on the rotation signal.

When a sign that is applied to the tire 1a and is indicative of a wear state, such as a slip sign, appears due to wear, the shape of the tire ground contact surface with the road surface changes, and thus the rotation speed fluctuation pattern changes. The wear state determination unit 4 determines, in the rotation speed fluctuation patterns, the component value induced by the characteristic embodied in the tire 1a, the component value varying in accordance with the wear state of the tire 1a. The wear state determination unit 4 estimates a wear state of the tire 1a by comparing the determined component value with information such as a relationship curve indicating a relationship between component values that are set in advance and a progress state of wear, a table, a map, a threshold, or the like, and outputs information regarding the estimated wear state.

Preferably, a characteristic structure that causes specific rotation-synchronous rotation speed fluctuations to occur during tire rotation may be embedded in a tire tread by the following methods, and occurrence of the specific rotation speed fluctuations may be detected. However, a shape error of the tire caused due to the characteristic structure being embedded is made very slight such that vibration or noise does not occur and ride comfort does not deteriorate.

That is, in the wear amount detection device for the tire 1a of the automobile according to the present invention, the wear state determination unit 4 includes a relationship set portion 12a configured to set a relationship between progress states of wear of the tire 1a and component values of induced by the characteristic embodied in the tire 1a, the value varying in accordance with a wear state of the tire, and the characteristic includes one of the following a to i.

a. A characteristic in a specific portion in which a material is different from that of the other portions;
b. A characteristic in a form in which an area or a pattern thereof changes as wear progresses;
c. A characteristic that induces rotation speed fluctuation patterns which are different from each other depending on a wear amount; and
d. A characteristic that induces a special pattern having a specific fluctuation over one rotation. That is, a detected rotation speed fluctuation pattern includes a plurality of specific fluctuations over one rotation, and is not a local and simple pattern that occurs once in one rotation of the tire 1a, in order that the detected rotation speed fluctuation pattern is distinguished from a rotation speed fluctuation pattern obtained in the case with noise from a road surface, catching of a small stone or the like, a flat spot of the tire 1a, or the like.

Preferably, the characteristic of the tire 1a includes a structure having a characteristic (a characteristic structure). More specifically, the characteristic includes any of the following structures.

e. A characteristic structure configured such that a tread pattern of the tire 1a varies with wear, the characteristic structure thereof being formed in a direction traversing a tread;
f. Characteristic structures formed at a plurality of positions in a rotation direction of the tire 1a such that the intervals of the plurality of positions are not equal in the rotation direction;
g. A characteristic structure including a portion in the tread, some of the materials forming the portion being different from the other portions of the tread.
h. A characteristic structure configured such that the rotation speed fluctuation pattern having a special fluctuation as wear progresses; and
i. Conversely, a characteristic structure including a portion in which a groove is formed is an initial state, and a rotation speed fluctuation pattern decreases with wear.

In a preferred embodiment, the wear state determination unit 4 may obtain the rotation speed fluctuation patterns in a running speed range selected from one or more set running speed ranges.

Even if the tire 1a is in the same wear state, rotation signal fluctuations detected by the rotation sensor 2 are different from each other depending on the running speed of the vehicle. Thus, by obtaining the rotation speed fluctuation pattern in a state where the running speed is within the set running speed range, the rotation speed fluctuation pattern can be accurately obtained.

In a preferred embodiment, the wear state determination unit 4 may perform obtaining the rotation speed fluctuation pattern and a wear state estimation process for each of a plurality of set running speed ranges, and may determine a wear state as a whole on the basis of wear state estimation results by running speed range in the plurality of running speed ranges.

As described above, even though the tire 1a is in the same wear state, the characteristic of rotation signal fluctuations detected by the rotation sensor 2 are different from each other depending on the running speed of the vehicle. Thus, by performing the wear state estimation process in each of the plurality of set running speed ranges and determining a wear state as a whole on the basis of the results in the plurality of running speed ranges, wear detection by obtaining the rotation speed fluctuation pattern can be performed with higher accuracy.

In a preferred embodiment, the wear state determination unit 4 may transform the obtained rotation speed fluctuation patterns to rotation order components, may obtain a level of a specific rotation order component that can be indicative of a wear state, and may determine a wear state. According to the rotation order, a wear state can be simply and accurately determined.

In the case where the rotation order transform is performed, a magnitude of a rotation order component included in the obtained rotation speed fluctuation patterns is obtained so as be used as an evaluation value for determining a wear state. The magnitude of rotation order component indicates the wear state. Accordingly, a wear state can be determined with higher accuracy.

In a preferred embodiment, the signal processing unit 3 may obtain a difference between the obtained rotation speed fluctuation patterns and reference patterns in a state where phase of the rotation speed fluctuation patterns are aligned with each other, and a wear state may be determined on the basis of the difference.

If a rotation speed fluctuation pattern at the initial stage (at the time when almost no wear has occurred, such as immediately after tire replacement) is stored as the reference pattern in advance, an amount of change from the initial state including information such as an error pattern specific to the sensor or imbalance of the tire 1a can be detected, so that the detection sensitivity can be enhanced further.

In a preferred embodiment, the rotation sensor 2 may include a magnetic encoder 2a or a pulsar gear and a magnetic sensor 2b configured to detect the magnetic encoder 2a or the pulsar gear, and may further include a multiplication circuit 2ca configured to output a rotation pulse obtained by multiplying a detection signal of the magnetic sensor 2b.

For accurately detecting a rotation speed fluctuation pattern and has specific fluctuations, it is necessary to use a sensor having sufficient detection accuracy and a sufficient space resolution, as the rotation sensor 2 mounted on the wheel 1. The rotation sensor 2 that is obtained by combining the magnetic encoder 2a or the pulsar gear and the magnetic sensor 2b and has an increased resolution by multiplying a detected magnetic field signal as described above, is resistant to a poor environment such as temperature change or dirt, and has a rotation resolution of 100 pulses or more per one rotation. Therefore, the rotation sensor 2 is suitable for this use.

In a preferred embodiment, the wear amount detection device may further include a wear estimation result utilization module 17 configured to issue a warning to a driver or change a control state of the vehicle on the basis of the wear information outputted from the wear state determination unit 4. Specifically, the wear estimation result utilization module 17 may have, for example, any of the following functions.

The wear estimation result utilization module 17 may be configure to cause a warning notification device 19 at a driver's seat to perform display on the basis of the wear information outputted from the wear state determination unit 4. The warning notification device 19 is, for example, a warning lamp 19a or an image display device such as a liquid crystal display device. It is possible to promote the driver to confirm or check a slip sign, for example, by lighting up the warning lamp 19a in accordance with a wear amount.

The wear estimation result utilization module 17 may be configured to: change a control parameter of a vehicle control computer 22 on the basis of the wear information outputted from the wear state determination unit 4; and perform safety control that takes performance of the tire 1a into consideration.

By changing the parameter of the safety control system 22a for vehicle attitude control in accordance with a decrease in the performance of the tire 1a and adjusting the safety control system 22a in consideration of the decrease in the performance of the tire 1a, unnecessary safety control can be eliminated and safety control in the necessary case can be assuredly performed.

The wear estimation result utilization module 17 may be configured to issue a warning in a specific weather on the basis of a weather during running and the wear information outputted from the wear state determination unit 4. In accordance with a wear state detected, attention can be called if it is determined that the risk is high, for example, a warning is not issued in fine weather, but a warning is issued during running in rainy weather. Accordingly, excessively issuing a warning is avoided, and improvement of reliability regarding a warning and paying attention to a warning by the driver can be expected.

The wear estimation result utilization module 17 may cause a computer mounted on the vehicle to transmit the wear information outputted from the wear state determination unit 4, via a communication line to a terminal at a determined business place 20 where checking of the vehicle or replacement of the tire 1a is possible.

Since information regarding checking and replacement for wear is transmitted to the terminal at the business place 20 as described above, confirmation of stock of the tire 1a or the like at the business place 20 can be performed early, and prompt and appropriate checking and replacement can be expected.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9 shows graphs (a) to (c) illustrating respective rotation speed fluctuations at different velocities;

FIG. 22A is a cross-sectional view showing a second example of the rotation sensor used by the wear amount detection device; and FIG. 22B is a perspective view of the rotation sensor in FIG. 22A.

DESCRIPTION OF EMBODIMENTS

Figure 1:
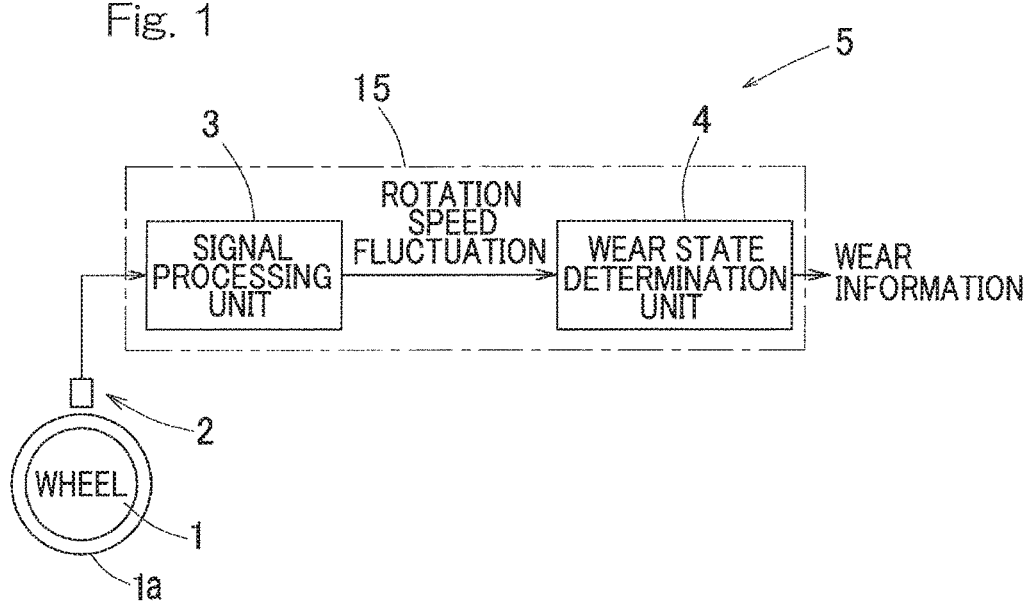
FIG. 1 is a block diagram showing a schematic configuration of a wear amount detection device for automobile tires according to a first embodiment of the present invention.

A wear amount detection device according to a first embodiment of the present invention will be described with reference to the drawings. As shown in FIG. 1, the wear amount detection device 5 for automobile tires includes: a rotation sensor 2 that detects a rotation speed of a wheel 1 mounting a tire 1a, which is a wear detection target, and is mounted on a wheel bearing or a drive shaft outer ring; and a signal processing unit 3 for processing an outputted rotation signal. The wear amount detection device 5 for automobile tires also includes a wear state determination unit 4 that detects wear of the tire 1a by using output from the signal processing unit 3. The signal processing unit 3 and the wear state determination unit 4 form a wear amount detection device main part 15. The wear amount detection device main part 15 may be an independent ECU, or may be provided as a part of an ECU that performs control of the entirety of a vehicle. The rotation sensor 2 is realized by a wheel speed sensor. FIGS. 15 to 20 show examples of a wheel bearing with a rotation sensor, and the examples will be described later.

In FIG. 1, the signal processing unit 3 extracts rotation speed fluctuations synchronized with rotation, from the rotation signal detected by the rotation sensor 2, and extracts a rotation speed fluctuation pattern synchronized with rotation over a plurality of rotations, from the rotation speed fluctuation. The wear state determination unit 4 obtains a value of a component induced by a feature structure (characteristic structure), which is provided in the tire 1a on the wheel 1 and is indicative of a wear state, from the rotation speed fluctuation pattern extracted by the signal processing unit 3, estimates a wear state of the tire 1a on the basis of the obtained value, and outputs the wear state. Hereinafter, each unit will be specifically described.

Figure 2:
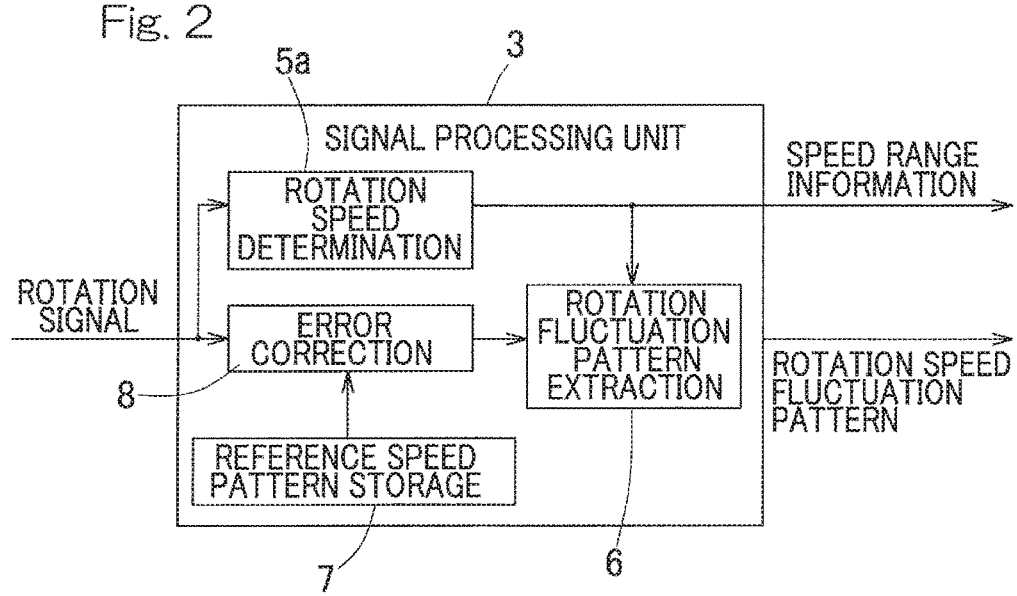
FIG. 2 is a block diagram showing a schematic configuration of a processing unit of the wear amount detection device.

FIG. 2 shows a schematic configuration of the signal processing unit 3. In the signal processing unit 3, a rotation speed determination section 5a measures a rotation speed of the wheel 1 during running by using the rotation signal detected by the rotation sensor 2, and a rotation speed fluctuation pattern extraction section 6 extracts the rotation speed fluctuations synchronized with rotation of the wheel 1, that is, a rotation speed fluctuation pattern for every one rotation. Here, a magnetic encoder including a detection target in the rotation sensor 2 can include a pitch error caused due to manufacturing variations. Thus, a rotation speed fluctuation pattern in a normal state that is an initial state may be stored as a reference speed pattern P0 in a reference speed pattern storage section 7 in advance, and a minute error component superimposed on the rotation signal of the rotation sensor 2 may be corrected by an error correction section 8.

In the signal processing by the rotation speed fluctuation pattern extraction section 6, in order to eliminate influence of irregularities of a road surface, a rotation signal in a period over a certain number of times of rotations is processed, and a certain rotation speed fluctuation pattern is extracted. For example, rotation synchronous components from a rotation signal of the wheel 1 over several rotations are averaged and detected. By applying an averaging process or an integration process to the extraction processing, influence of random rotation speed fluctuations that are not synchronized with rotation of the wheel 1 is effectively eliminated.

The function of the wear state determination unit 4 in FIG. 1 will be described. When a slip sign appears due to wear of the tire 1a, a pattern of rotation speed fluctuations changes due to a change in the shape of the ground contact surface of the tire. The wear state determination unit 4 detects the change of the pattern, thereby detecting a wear state.

Preferably, a feature structure, such as a shape, which causes specific rotation-synchronous rotation speed fluctuations to occur during tire rotation may be included in a tire tread by the following schemes, and a change in rotation speed fluctuation pattern caused due to the feature structure may be detected. However, the shape of the feature included is very small such that vibration or noise does not occur and ride comfort does not deteriorate.

The feature provided to the tire 1a, that is, the characteristic embodied in the tire 1a in order to allow for detection of a wear amount will be exemplified below:

(a) The material of a specific portion of the tire 1a is non-uniform. For example, the specific portion is made harder or softer than the other portion.

(b) The feature is made into a form in which, when wear progresses, for example, blocks are connected to each other, so that the area or arrangement pitch of a feature structure forming the feature changes.

(c) The feature is made into a form in which, when wear progresses, a block is divided, so that the area or arrangement pitch of a feature structure forming the feature changes.

(d) A tire rotation speed fluctuation pattern may be classified in several patterns in accordance with a wear amount.

(e) The feature may be arranged such that a extracted rotation speed fluctuation pattern indicates a unique pattern, not a local and simple pattern, in order that the extracted rotation speed fluctuation pattern is distinguished from a rotation speed fluctuation pattern obtained in the case with noise from a road surface, catching of a small stone, influence of a flat spot of the tire, or the like.

A rotation speed fluctuation pattern may easily change with a shape feature provided in a direction traversing a tread surface. Thus, the feature structure indicating wear is preferably provided in the direction traversing the tread surface. In order to suppress vibration or noise, a feature may be provided in a part of the overall length along the direction traversing the tread surface in an initial wear state (a state where almost no wear has occurred), and the feature changes, as wear progresses, such that the length of the feature in the traversing direction becomes larger and easy to detect and recognize.

Figure 6:
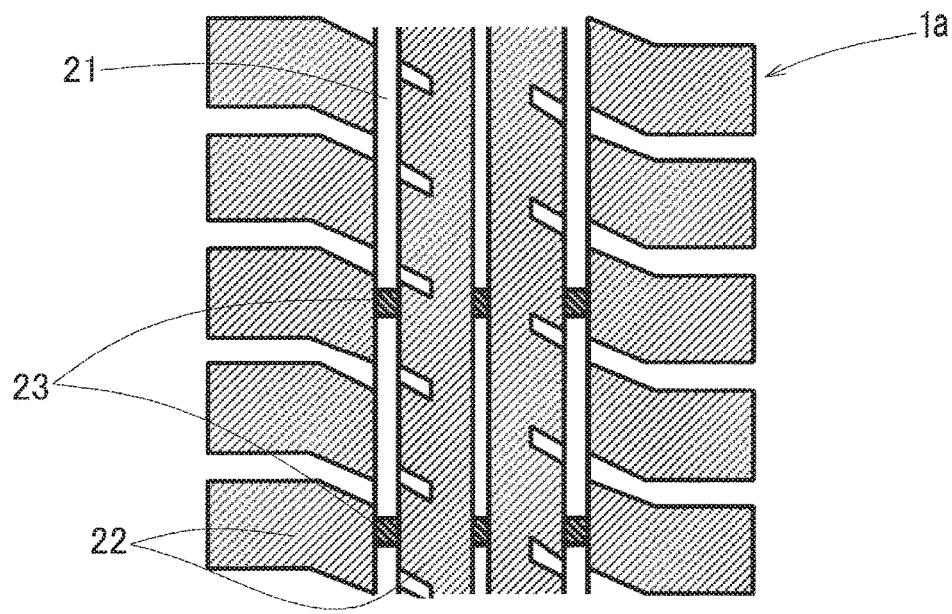
FIG. 6 is a partial plan view showing an example of a pattern configuration of a tread of a tire that is a detection target for the wear amount detection device.

FIG. 6 shows an example of a pattern of a feature structure formed in the tread. When the wear amount of the tire 1a reaches a specific wear amount, one or a plurality of slip sign portions 23 (a plurality of slip sign portions 23 in the present embodiment), which function as a feature structure provided within grooves 21, are exposed. Thus, blocks 22 are connected to each other, so that the shape of the surface of the tire 1a changes. If the slip sign portions 23 are formed from a hard material, a change in rotation speed fluctuations easily occurs at these portions.

Figure 7:
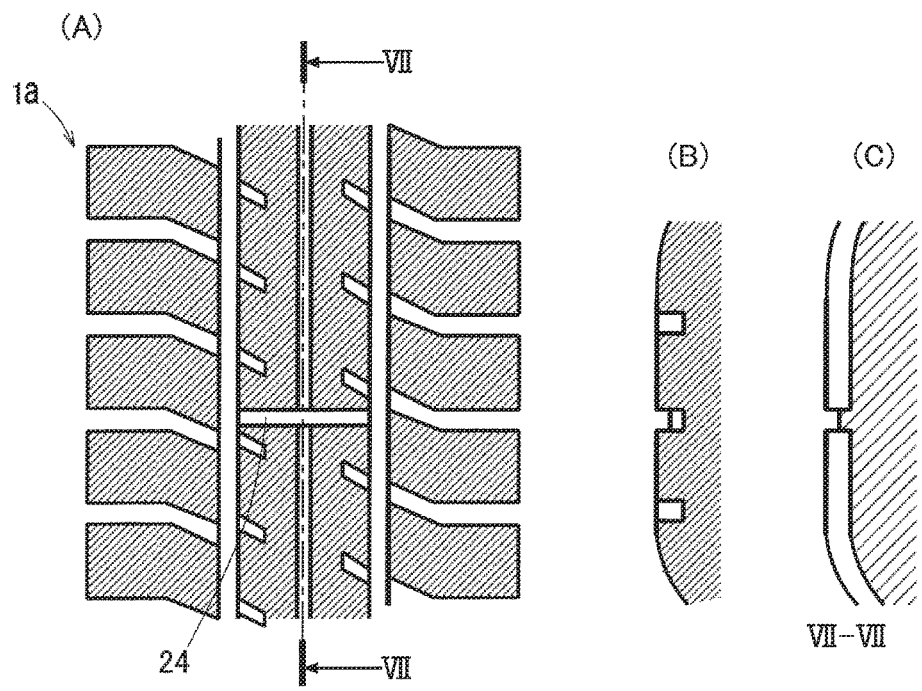
FIG. 7 shows another example of the pattern configuration of the tread of a tire that is the detection target for the wear amount detection device, diagram (A) is a partial plan view, diagram (B) is a cutaway side view, and diagram (C) is a cross-sectional view as seen from the direction of arrows VII-VII.

Unlike the example of FIG. 6, as shown in the diagrams (A) to (C) of FIG. 7, a groove 24, a characteristic feature structure may be formed in the tread of the tire 1a. In this case, speed fluctuations are observed at a constant rotation phase in the normal state (initial wear state), but when the groove 24 disappears along with wear, a fluctuation waveform becomes small, so that a wear state can be estimated on the basis of this change.

Figure 8:
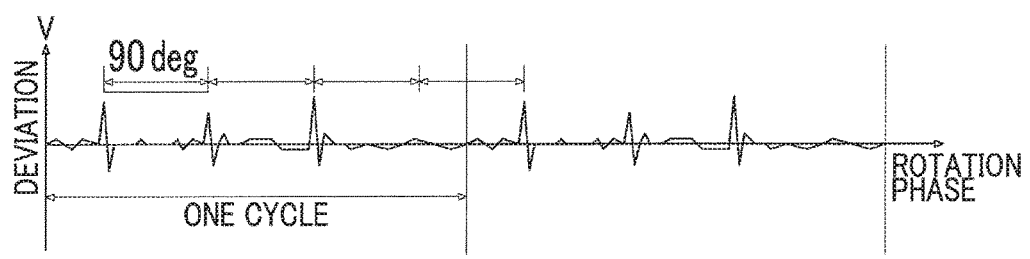
FIG. 8 is an explanatory diagram of an example of a detection signal of a feature pattern detected by the wear amount detection device.

In addition, characteristic feature portions are preferably disposed at unique phase intervals in a rotation direction. For example, if the feature portions are disposed at three locations where phases are 0°, 90°, and 180°, a speed fluctuation pattern shown in FIG. 8 is observed along with rotation. Within one rotation, three characteristic waveform portions are observed at intervals of 90° and 180° in synchronization with rotation. Thus, even if there is disturbance such as irregularities of a road surface or catching of a small stone, the feature portions are easily detected. Since the feature portions are disposed not equally, the feature portions are easily detected without influence of noise, and erroneous detection can be suppressed.

Response to a change in rotation speed pattern will be described.

Rotation speed fluctuations depend on the state of the tire 1a, and thus are influenced by a running speed. Portions, within elliptical broken lines, of waveforms shown in the graphs (a) to (c) of FIG. 9 are speed fluctuation waveforms observed at rotation positions where rotation speed fluctuations occur, and the waveform changes depending on the running speed, as shown in the graphs (a) to (c) of FIG. 9. That is, the rotation speed fluctuation component exhibits frequency characteristics due to the transfer characteristics of the tire 1a, and the phase or amplitude of the rotation speed fluctuation component changes depending on the running speed. Thus, when a rotation speed fluctuation pattern is extracted, processing is desirably performed by using a signal in a state where the rotation speed is within a specific range, and the signal processing unit 3 (FIG. 2) is provided with a function to determine a rotation speed, by providing the rotation speed determination section 5a.

Preferably, in the rotation speed determination process by the rotation speed determination section 5a, a rotation speed fluctuation pattern is classified on the basis of a plurality of rotation speed ranges (rotation speed levels). That is, a reference rotation speed fluctuation pattern to be compared is stored in the reference speed pattern storage section 7 for each rotation speed range in advance, and the rotation speed fluctuation pattern extraction section 6 is configured to determine a wear state for each of the plurality of ranges and determine a wear state as a whole based on these results. Since a rotation speed fluctuation pattern is detected in each of the plurality of speed ranges, it is possible to perform determination as a whole on the basis of more running data as compared to the case where only a pattern in one limited rotation speed range is extracted and determination is performed. Thus, the accuracy of wear detection improves.

Figure 10:
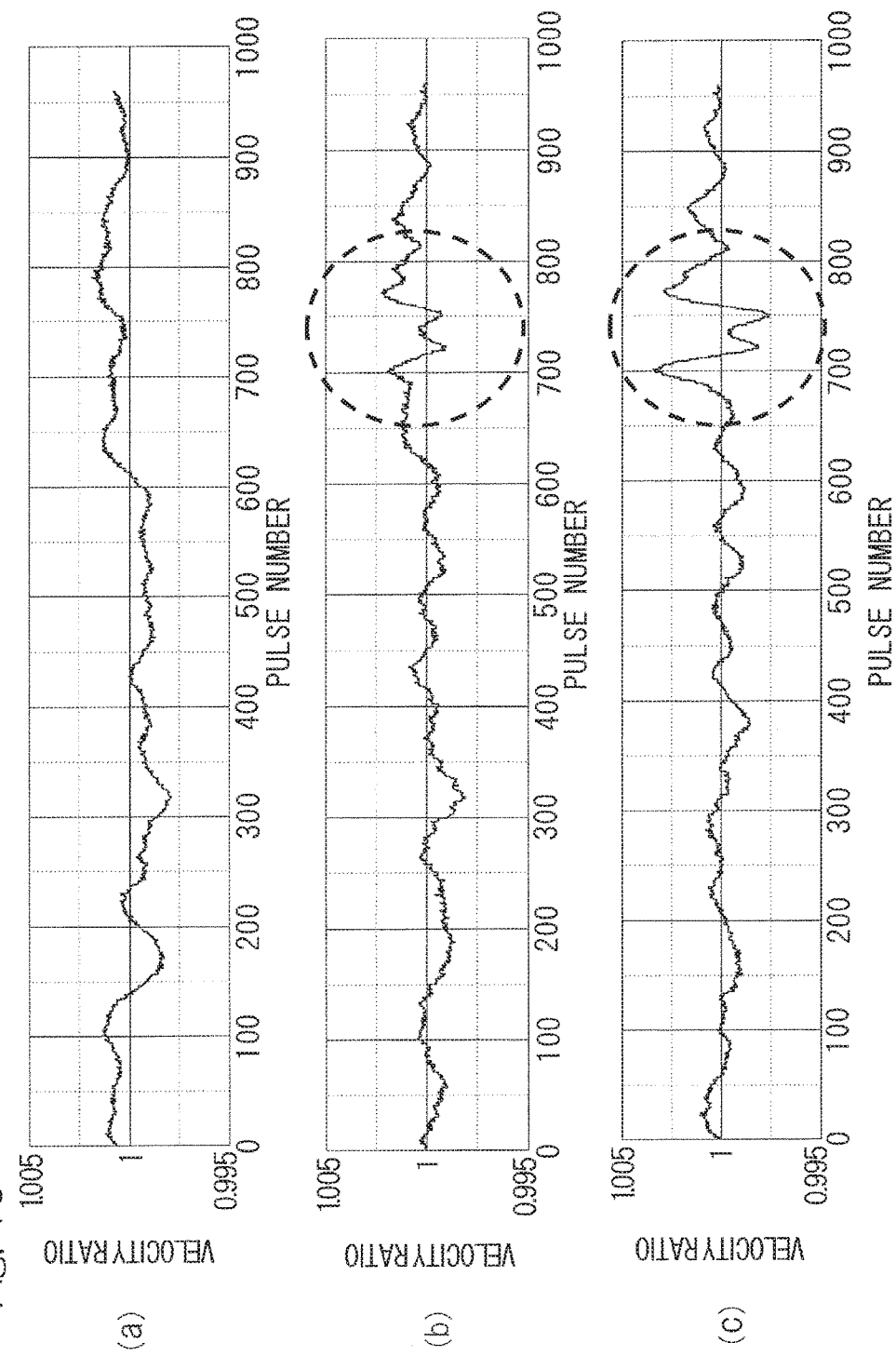
FIG. 10 shows graphs (a) to (c) illustrating an example of rotation speed fluctuation data detected by the wear amount detection device.

The graphs (a) to (c) of FIG. 10 show an example of data obtained through testing of a formed pseudo feature pattern. In a state where a plastic tape having a thickness of about 0.3 mm was attached to the tire tread surface so as to traverse the tread, running was performed on an asphalt road surface at a speed of about 15 km/h for dozens of meters, and rotation speed data was collected at a resolution of 960 times per one rotation. The frictional coefficient decreases on the plastic tape surface, and thus a force acting on the tire ground contact surface changes, so that a change in rotation speed fluctuations occurs. In addition, the magnitude of the change in rotation speed fluctuations changes depending on the width of the plastic tape. The graphs (a) to (c) of FIG. 10 show an example of an extracted speed fluctuation patterns for one rotation. In graphs (a) to (c) of FIG. 10, rotation velocities with no tape, with a tape width of 6 mm, and with a tape width of 12 mm are normalized and plotted, respectively. It is apparent that unique rotation speed fluctuation patterns occur due to the provision of the features.

Figure 3:
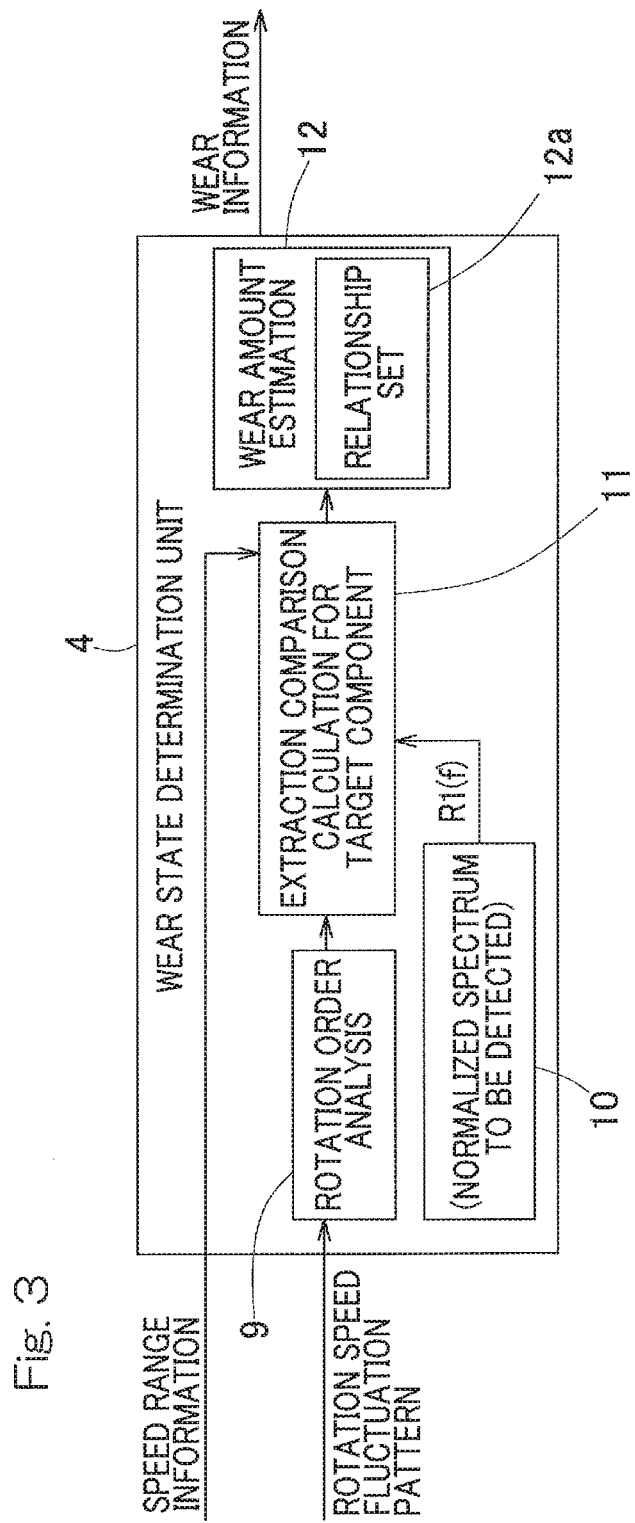
FIG. 3 is a block diagram showing a schematic configuration of a wear state determination unit of the wear amount detection device.

An example of a method for detecting a rotation speed fluctuation pattern caused due to the feature structure, to detect a progress state of wear will be described with reference to FIG. 3. FIG. 3 shows an example of a schematic configuration of the wear state determination unit 4. A rotation order analysis section 9 obtains a rotation order spectrum for rotation speed fluctuations detected during running. A comparison calculation section 11 monitors an output level of an order component $P(n)$ of a rotation speed fluctuation pattern which order component $P(n)$ indicates wear, and compares the output level with a reference. A wear amount estimation section 12 determines progress of a wear state on the basis of the result of the comparison. The comparison calculation section 11 may perform comparison with a predetermined threshold level. Alternatively, a level $P0(n)$ in the initial state may be stored in advance and determination may be performed based on a change amount $P(n)/P0(n)$.

Figure 11:
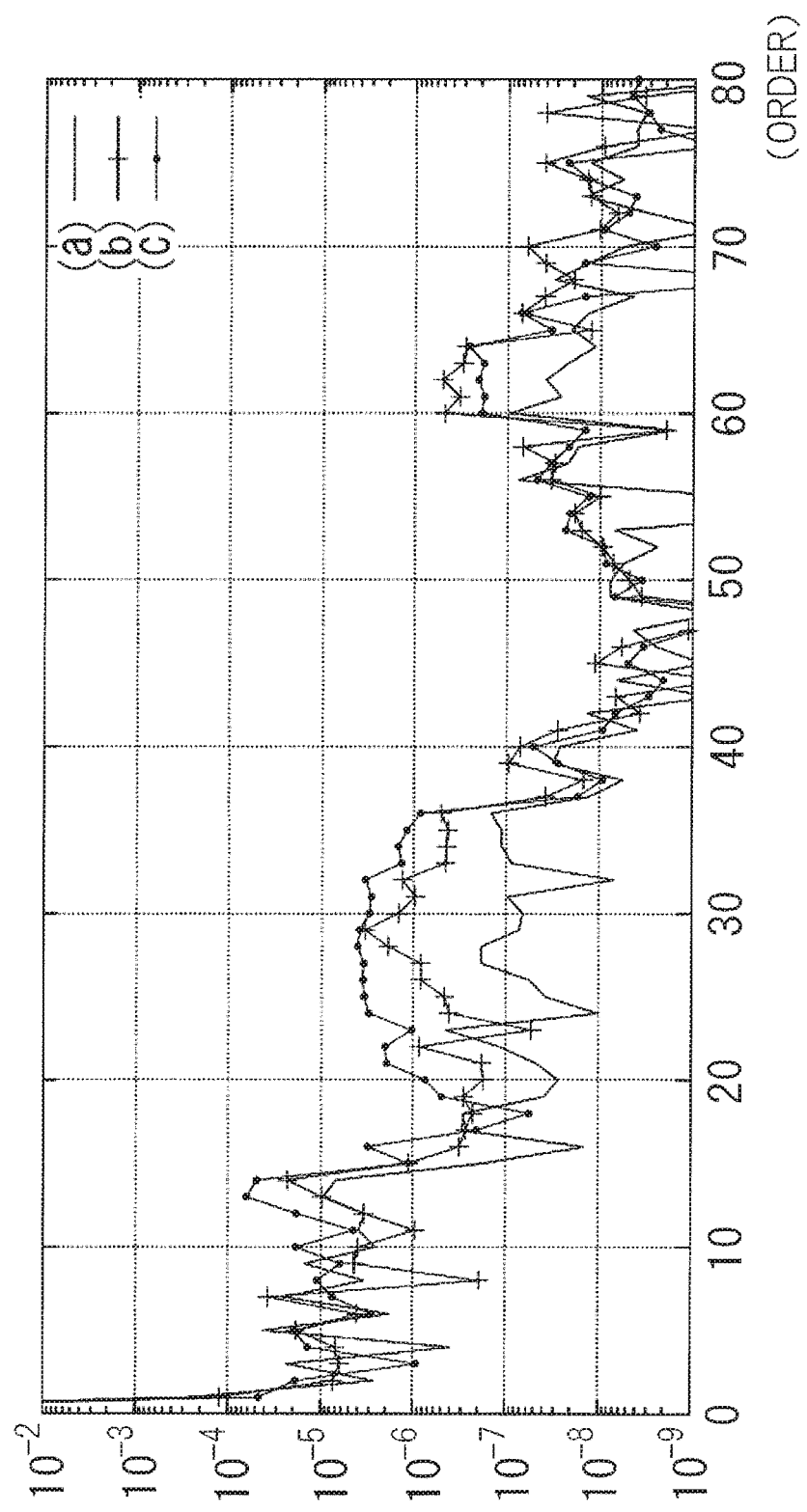
FIG. 11 is a graph showing an example of rotation order spectra detected by the wear amount detection device.

FIG. 11 shows rotation order spectra obtained from the waveforms in the graphs (a) to (c) of FIG. 10. In this example, the changes around the 25th to 35th orders and around 60th to 64th orders greatly appear. Thus, for example, thresholds are provided for the 30th order, the 33th order, and the 62th order, respectively, and if detected spectra $P(30)$, $P(33)$, and $P(62)$ exceed the respective thresholds, it is determined that wear has progressed.

In addition, a plurality of space frequency (order) ranges for the rotation speed fluctuation pattern to be detected may be provided (that is, a plurality of calculation windows may be set), the levels of rotation order components in the corresponding ranges may be extracted, so that a wear state may be determined as a whole on the basis of these results.

Figure 12:
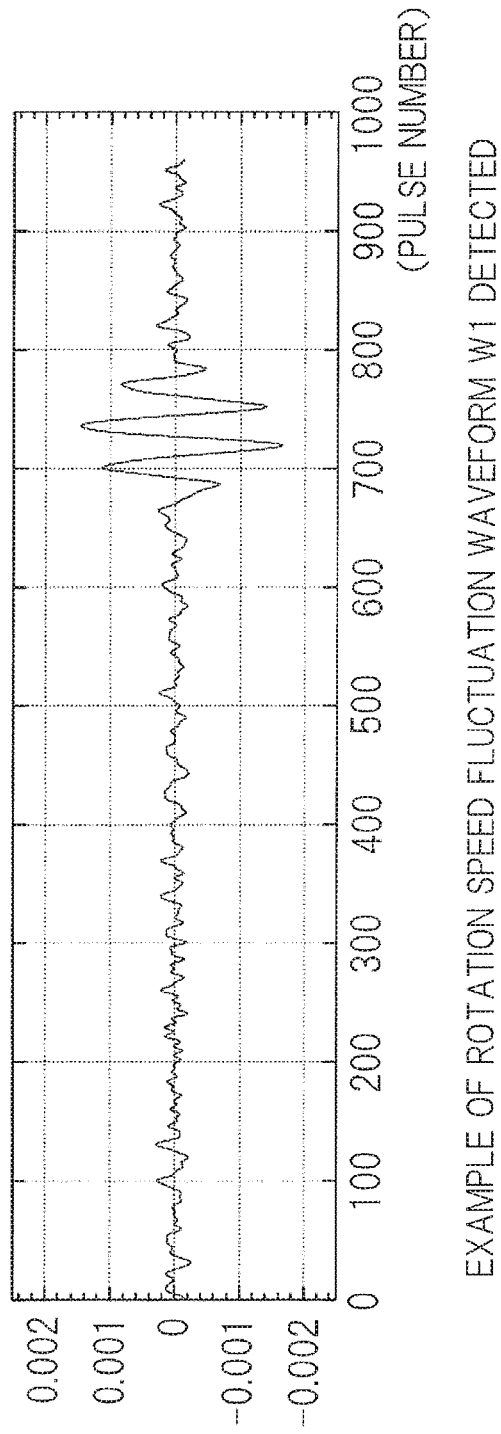
FIG. 12 is a graph showing an example of a rotation speed fluctuation waveform by a reference pattern to be detected for the wear amount detection device.
Figure 13:
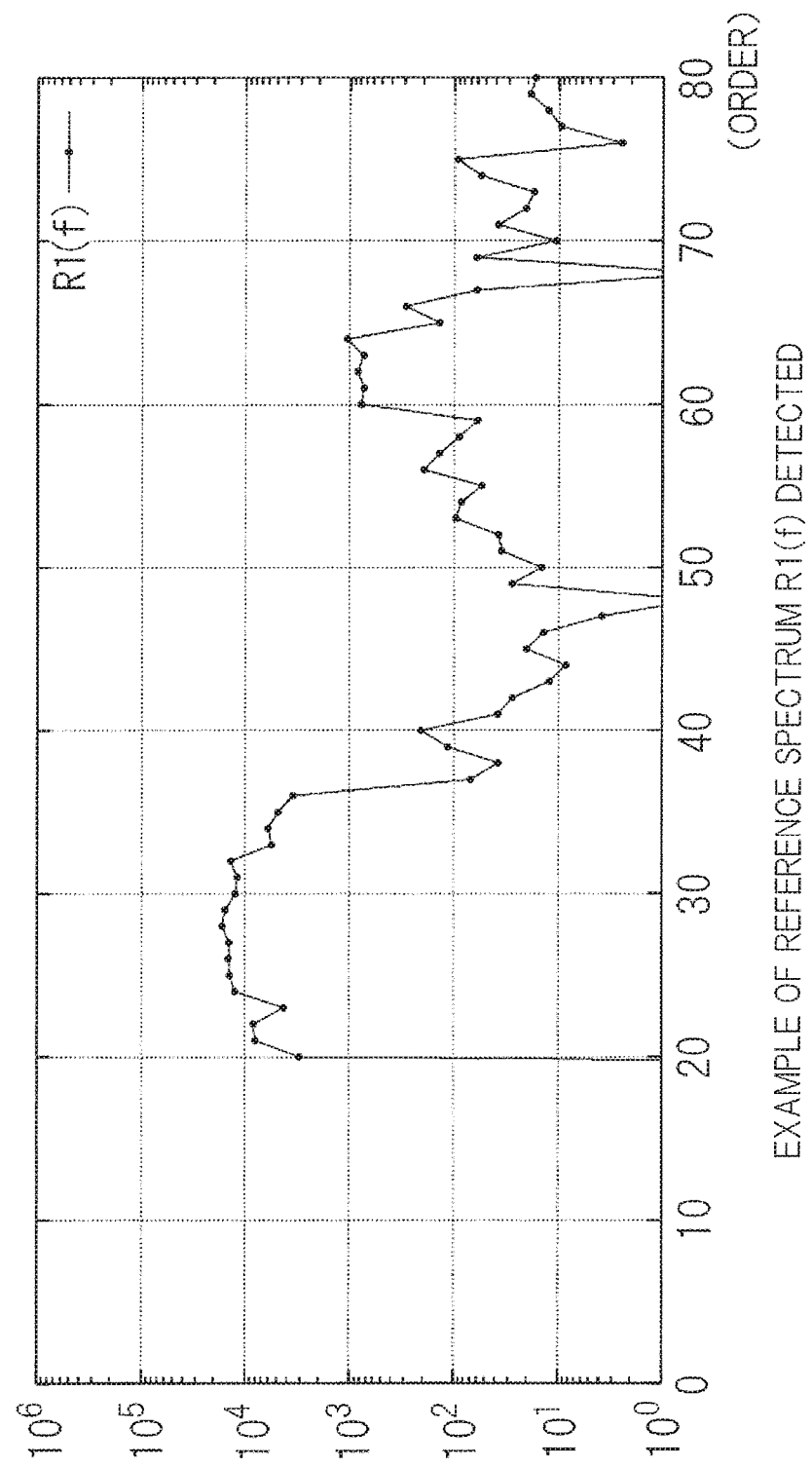
FIG. 13 is a graph showing an example of a reference spectrum of a detection target pattern for the wear amount detection device.

For example, rotation speed fluctuations induced by a feature pattern p1 provided for wear detection are a waveform W1 shown in FIG. 12, and a spectrum thereof is R1(f) shown in FIG. 13. The rotation speed fluctuation waveform W1 is a waveform obtained by eliminating a low-frequency component, which is considered as road surface disturbance, from the waveform in the graph (c) of FIG. 10. The magnitude of a P1(f) component included in a frequency spectrum Pin(f) of the detected rotation speed fluctuation pattern is obtained, and the value thereof is considered as an evaluation value.

Figure 14:
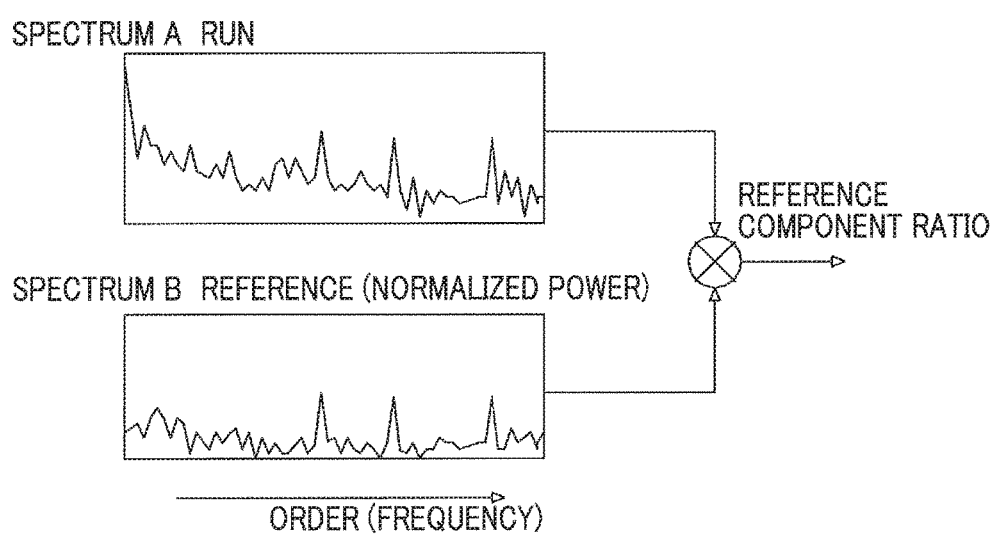
FIG. 14 is an explanatory diagram showing an example of extraction of a rotation order component of a wear characteristic pattern by the wear amount detection device.

Specifically, as shown in FIG. 14, a known normalized spectrum B to be detected is represented by:

$$R1(f)=P1(f)/|P1(f)|$$

(|P1(f)| represents the total sum of spectra in a target range), and by calculation of an inner product with a detected spectrum A, an evaluation value E=Pin(f)·R1(f) is obtained. A wear state is determined in accordance with the magnitude of the obtained evaluation value E. According to this process, a wear state is determined by using more information. Thus, noise-resistant assured detection of a wear state is enabled.

Figure 4:
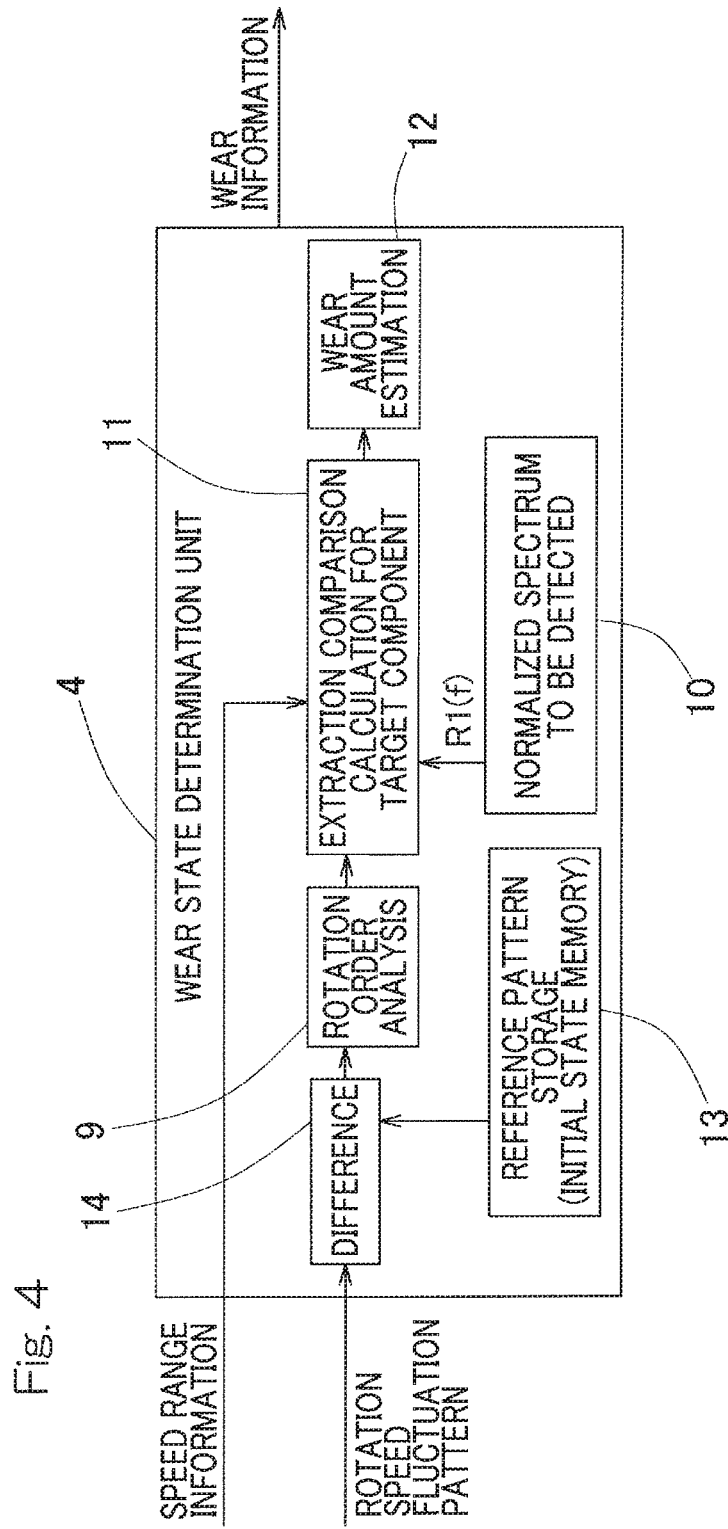
FIG. 4 is a block diagram showing a schematic configuration of a modification of the wear state determination unit of the wear amount detection device.

In a wear amount detection device according to a second embodiment, a wear state is determined by another method. A reference may be provided for the rotation sensor 2 such that the rotation phase of a rotation speed fluctuation pattern during running can be matched, and a change in the rotation speed fluctuation pattern may be directly detected. For example, as shown in FIG. 4, the difference between a detected rotation speed fluctuation pattern and a reference rotation speed fluctuation pattern stored in a reference pattern storage section 13 is obtained by a difference detection section 14 in a state where rotation phases of the patterns are matched, and an amount of change from a preset reference pattern is obtained. If the rotation speed fluctuation pattern W1 for the time of wear by the feature pattern p1 provided for detection is extracted in the amount of change, it is determined that wear has progressed. In this case, the degree of progress of wear is also estimated in accordance with the magnitude of the extracted pattern.

If a rotation speed fluctuation pattern at the initial stage is stored as the reference pattern in advance, an amount of change from an initial state including information such as an error pattern specific to the rotation sensor 2 or imbalance of the tire 1a can be detected, so that the detection sensitivity can be enhanced further. However, when the tire 1a or the wheel 1 is replaced, the reference pattern changes, and thus the accuracy decreases. Thus, preferably, the reference pattern storage section 13 has a function to update the stored reference pattern.

The wear amount estimation section 12 in the wear state determination unit 4 in FIG. 3 includes a relationship set portion 12a. The relationship set portion 12a sets a relationship between: a value of a component induced by the feature that is provided in the tire 1a and is indicative of a wear state as described above; and a progress state of wear of the tire 1a, by using the above thresholds or the like, and a progress state of wear is estimated on the basis of the result of the comparison by the comparison calculation section 11 and the relationship set by the relationship set portion 12a. The relationship set portion 12a may set a relationship between the value of the component and a progress state of wear of the tire 1a, for only a specific feature. In addition, the relationship may be stored for each of a plurality of types of features in advance, and the relationship corresponding to the tire 1a used for the vehicle may be selected by a predetermined selection operation device (not shown) and used at the time of initial installation of the tire 1a or at the time of replacement of the tire 1a.

The rotation sensor 2 will be described. As the rotation sensor 2, for making determination of rotation phase easy, a rotation angle sensor in which a Z phase (zero phase) signal is added may be used, or a resolver or another absolute angle sensor may be used.

For accurately detecting a rotation speed fluctuation pattern, the rotation sensor 2 mounted on the wheel 1 desirably has sufficient detection accuracy and a sufficient space resolution. For example, the rotation sensor 2 has accuracy that allows at least rotation speed fluctuations of 0.5% to be detected, and a pulse number per one rotation is set to be equal to or greater than 40. For obtaining sufficient data during low-speed rotation including higher-order rotation speed fluctuation components, the resolution of the rotation sensor 2 is desirably made higher. In consideration of a structure such as the block size of the tire 1a, in order that a resolution for a ground contact length of about 20 mm can be ensured, the output pulse number of the rotation sensor 2 per one rotation is desirably made equal to or greater than at least 100.

The output of the rotation sensor 2 does not necessarily need to be pulse output, and may be an analog signal. In the case that an analog signal outputted along with rotation is analyzed, rotation speed fluctuations can be extracted from distortion of a waveform included in the signal. Thus, the same process as in the case of pulse output is enabled. In particular, in the case where a resolution of rotation pulses (multiplication capability) is low, it is desired to perform signal processing at a high resolution by positively using an analog signal.

A specific example of the rotation sensor 2 is preferably, a sensor including a target including a magnetic encoder 2a or a pulsar gear and a magnetic sensor 2b for detecting the target and a multiplication circuit 2ca that outputs a rotation pulse obtained by multiplying a detection signal of the magnetic sensor 2b, as shown in FIGS. 21A and 21B, and FIGS. 22A and 22B.

For accurately detecting a specific rotation speed fluctuation pattern, it is necessary to use a sensor having sufficient detection accuracy and a sufficient space resolution, as the rotation sensor mounted on the wheel. The rotation sensor 2 includes the magnetic encoder 2a or the pulsar gear and the magnetic sensor 2b associated therewith and has an increased resolution by multiplying a detected magnetic field signal as described above, and thus the rotation sensor 2 is resistant to a poor environment such as temperature change or dirt, and has a rotation resolution of 100 pulses or more per one rotation. Thus, the sensor having the above configuration is suitable as the rotation sensor 2 that is put in a poor environment such as temperature change or dirt and needs to extract rotation speed fluctuations during one rotation. The specific example of the rotation sensor 2 will be described later with reference to FIGS. 21A and 21B, and FIGS. 22A and 22B.

Figure 5:
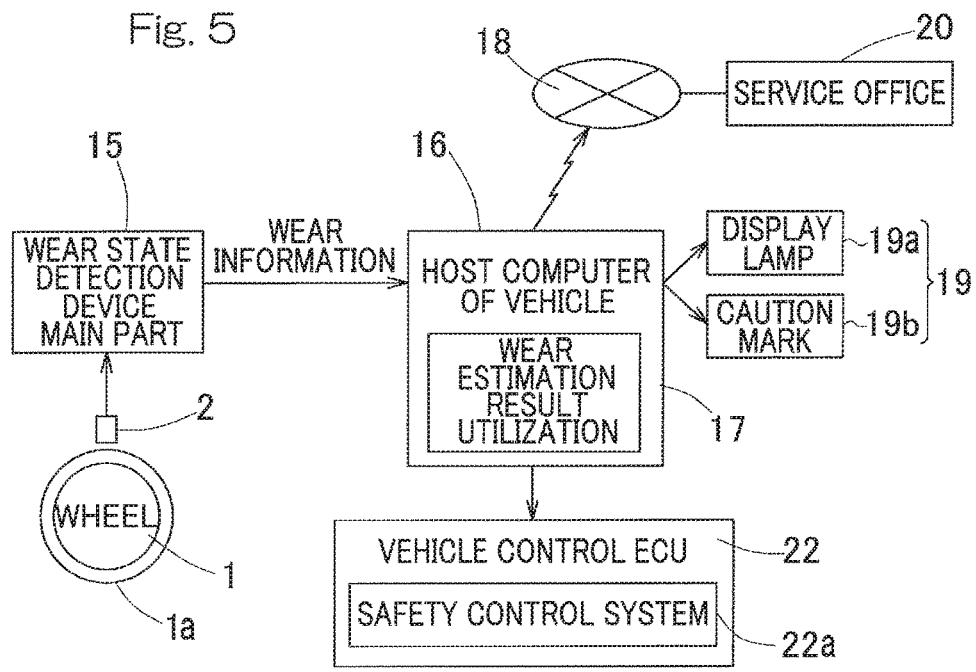
FIG. 5 is a block diagram showing a use form of the wear amount detection device.

An example in which wear state information detected by the wear state determination unit 4 is used will be described. FIG. 5 shows the example. A detected wear state of the tire is transmitted from the wear amount detection device main part 15, including the signal processing unit 3 and the wear state determination unit 4, to a host computer 16 of the vehicle. The host computer 17 includes a wear estimation result utilization module 17, which displays the wear state on a warning notification device 19 at a driver's seat in accordance with a wear amount. For example, the wear estimation result utilization module 17 lights up a display lamp 19*a* such as a warning lamp. Accordingly, a driver is promoted to confirm or check the slip sign. The warning notification device 19 may be one that displays an image of a caution mark on an image display device 19*b* such as a liquid crystal display device, in addition to the display lamp 19*a*.

Simultaneously with the display on the warning notification device 19, the wear estimation result utilization module 17 transmits information from the host computer 16 via a communication line network 18 capable of communicating with the vehicle, so that checking and replacement are promoted as necessary through a business place 20 such as a vehicle dealer or a service office.

In accordance with a wear state detected during running, the wear estimation result utilization module 17 may call attention if it is determined that the risk is high, for example, does not issue a warning in fine weather, but issues a warning during running in rainy weather. The wear estimation result utilization module 17 may have a function to automatically cause a computer-type vehicle control device 22 such as an electronic control unit (ECU) to limit a running speed if it is determined that the present state is in a particularly risky state. In addition, the wear estimation result utilization module 17 may change a parameter of a safety control system 22*a* for vehicle attitude control and the like in the vehicle control device 22 in accordance with the detected wear state, and may adjust the safety control system in consideration of a decrease in tire performance.

The advantageous effects of the wear amount detection device for automobile tires according to this embodiment will be described below:

(a) Since a wear amount of the tire 1*a* can be detected during running, it is not necessary to provide a special sensor. Thus, the wear amount detection device can be implemented on the vehicle without considerably increasing the cost.

(b) Due to checking through visual observation in the conventional art, there is a possibility that wear is overlooked. On the contrary, since wear is detected by using the rotation sensor 2 of the vehicle, an appropriate warning is issued to promote safety confirmation, whereby preventative safety can be achieved.

(c) Even if the driver does not notice that the driver is driving in a state where the tire 1*a* has worn, the vehicle can issue a warning on the basis of the detection signal. Thus, a driving operation that avoids a slip is enabled, so that a traffic accident can be prevented.

(d) Since vehicle control that takes a wear state into consideration is enabled, appropriate driving assistance or safety control can be performed in accordance with a running condition, so that a traffic accident can be prevented.

(e) By integrating or averaging and extracting rotation synchronous components, a very slight rotation speed fluctuation pattern can be detected. Thus, a slight feature for wear detection only needs to be provided, and the function can be implemented in a range where ride comfort is not influenced.

(f) In addition, sine the feature structure that causes a feature pattern (a rotation speed fluctuation pattern including special fluctuations) is disposed at one or a plurality of predetermined rotation phase positions such that a feature pattern is easily extracted from a rotation speed fluctuation pattern, the feature structure, for wear detection, provided in the tire 1*a* can be made to have a minimum size and can be configured so as not to influence ride comfort.

(g) Since the rotation sensor 2 is incorporated into the wheel bearing assembly, a detection error decreases, and slight rotation speed fluctuations can also be detected. Thus, the shape feature, for wear amount detection, formed at such a level that ride comfort is not influenced can be accurately detected.

(h) By combination with a rotation sensor having a higher resolution, a rotation speed fluctuation component in a low-speed running state can be detected at a high resolution, the accuracy of pattern extraction for wear detection increases.

Figure 21A:
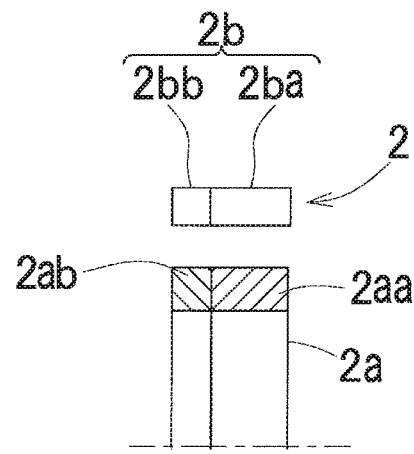
FIG. 21A is a cross-sectional view showing a first example of the rotation sensor used by the wear amount detection device.
Figure 21B:
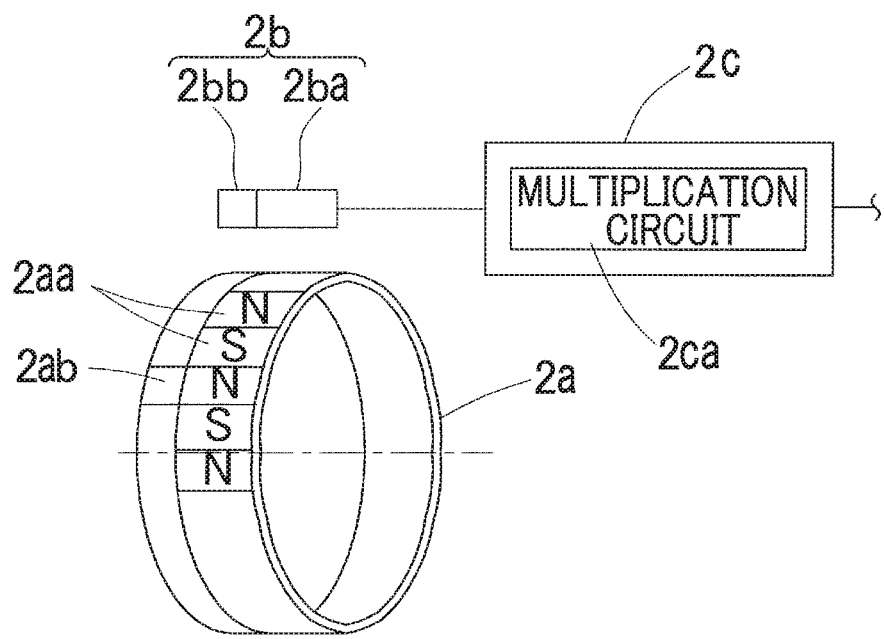
FIG. 21B is a perspective view of the rotation sensor in FIG. 21A.

FIGS. 21A and 21B show a first example of the rotation sensor 2. The rotation sensor 2 is a radial-type magnetic sensor, and includes: the annular magnetic encoder 2*a* including a target; and the magnetic sensor 2*b* that is opposed to the outer peripheral surface of the magnetic encoder 2*a* and detects magnetic fields of the magnetic encoder 2*a*. The magnetic encoder 2*a* alternately has N and S magnetic poles 2*aa*, and the magnetic sensor 2*b* outputs a sinusoidal rotation signal. The sinusoidal rotation signal is shaped into a rectangular shape by a signal processing module 2*c* and outputted as a rectangular pulse signal. The signal processing module 2*c* may have the multiplication circuit 2*ca*. In this case, the signal processing module 2*c* outputs a multiplied high-resolution rotation signal.

The magnetic encoder 2*a* may have a magnetic pole 2*ab* for Z phase (zero phase) detection at one location on the circumference thereof, the magnetic pole 2*ab* being aligned with the magnetic pole 2*aa* in an axial direction. In this case, the magnetic sensor 2*b* is provided with a sensor portion 2*ba* for detecting the alternate N and S magnetic poles 2*aa* as well as a sensor portion 2*bb* for detecting the magnetic pole 2*ab* for Z phase detection. The sensor portion 2*bb* outputs one Z phase (zero phase) signal per one rotation.

FIGS. 22A and 22B show a second example of the rotation sensor 2. The rotation sensor 2 is an axial-type magnetic sensor in which the annular magnetic encoder 2*a* and the annular magnetic sensor 2*b* are opposed to each other in an axial direction. The magnetic encoder 2*a* is mounted on a flange portion of a sensor mounting ring 2*d* having an L cross-sectional shape. The other configuration is the same as in the radial-type rotation sensor 2 shown in FIGS. 21A and 21B. Although not shown in the example of FIGS. 22A and 22B, a magnetic pole and a sensor portion for zero phase and a multiplication circuit may be provided also in the radial-type rotation sensor 2, similarly to the above.

FIGS. 21A and 21B, and FIGS. 22A and 22B each show the rotation sensor 2 including the magnetic encoder 2*a*, but the rotation sensor 2 may be a pulsar ring (not shown) including a target composed of a gear-type magnetic body. In this case, the magnetic sensor detects tooth portions of the pulsar ring and outputs a rotation signal.

The magnetic rotation sensor 2 using the magnetic encoder 2*a* or the gear-type pulsar ring is resistant to a poor environment such as temperature change or dirt. In the case of the magnetic type, it is difficult to provide small magnetic poles as compared to the case of an optical type, but a rotation signal of a resolution required for detecting a rotation speed fluctuation pattern is obtained if the multiplication circuit 2*ca* is provided.

Figure 15:
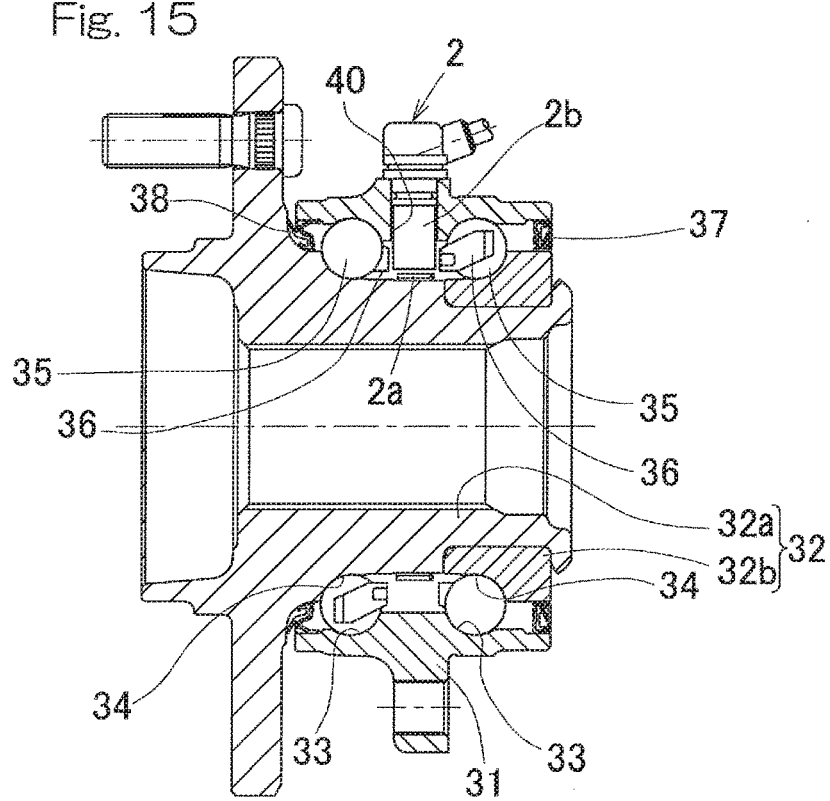
FIG. 15 is a cross-sectional view of an example of a wheel bearing equipped with a rotation sensor used in the wear amount detection device.
Figure 16:
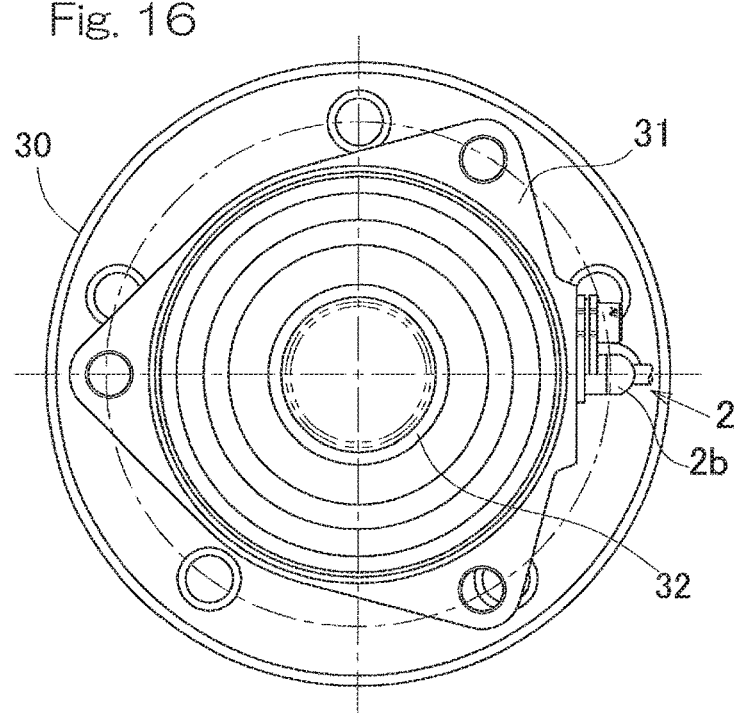
FIG. 16 is a view of the wheel bearing in FIG. 15 as seen from the inboard side.

FIGS. 15 to 20 show respective examples of the wheel bearing assembly in which the rotation sensor 2 is provided. A wheel bearing assembly 30 shown in FIGS. 15 and 16 is a third-generation inner ring rotating type and is for supporting a drive wheel, and an example is shown in which the rotation sensor 2 is provided at the center between double rows. The wheel bearing assembly 30 includes: an outer member 31 forming raceway surfaces 33 of the double rows in the inner circumference thereof; an inner member 32 forming raceway surfaces 34 opposed to the respective raceway surfaces 33; and rolling elements 35 of the double rows interposed between the raceway surfaces 33 and 34 of the outer member 31 and the inner member 32. The wheel bearing assembly 30 rotatably supports the wheel relative to a vehicle body. The wheel bearing assembly 30 is configured as an outward double-row angular contact ball bearing type, and the rolling elements 35 are balls and retained by a retainer 36 for each row. The inner member 32 includes a hub ring 32a and an inner ring 32b fitted to the outer periphery of an inboard side end portion of the hub ring 32a, and the raceway surfaces 34 are provided in the outer peripheries of the respective rings 32a and 32b. Both ends of a bearing space between the outer member 31 and the inner member 32 are sealed by seals 37 and 38.

In the wheel bearing assembly 30, the encoder 2a of the rotation sensor 2 is provided on the outer periphery of the inner member 32 and between both raceway surfaces 34, and the magnetic sensor 2b opposed to the encoder 2a is provided within a sensor mounting hole that is provided in the outer member 31 so as to extend in a radial direction. The rotation sensor 2 is, for example, the radial type described above with reference to FIGS. 21A and 21B.

Figure 17:
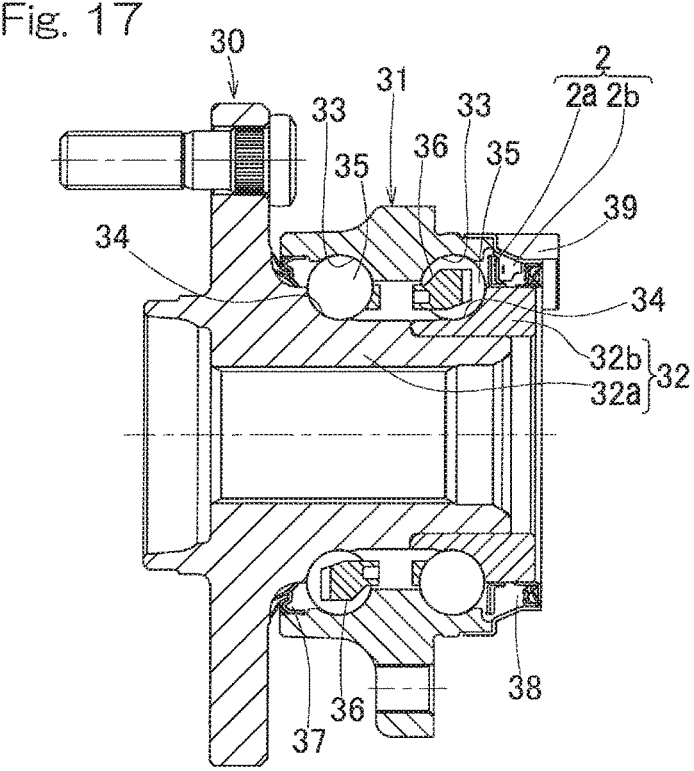
FIG. 17 is a cross-sectional view of another example of the wheel bearing equipped with the rotation sensor used in the wear amount detection device.
Figure 18:
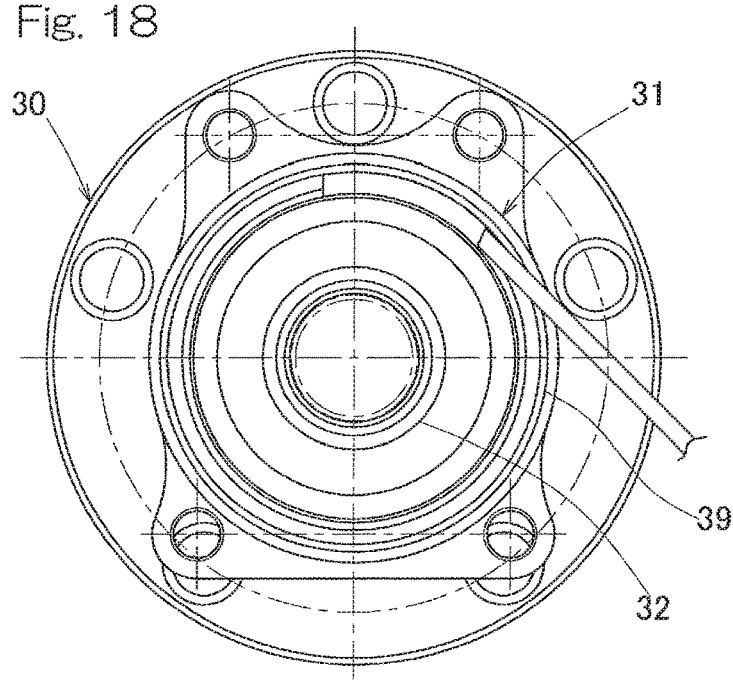
FIG. 18 is a view of the wheel bearing in FIG. 17 as seen from the inboard side.

A wheel bearing assembly 30 shown in FIGS. 17 and 18 is a third-generation inner ring rotating type and is for supporting a drive wheel, and an example is shown in which the rotation sensor 2 is provided at an inboard side end. In this example, the axial type described above with reference to FIGS. 22A and 22B is used as the rotation sensor 2. Specifically, a slinger at the seal 38 at the inboard side end which slinger is press-fitted to the outer peripheral surface of the inner member 32 serves as the sensor support ring 2d in the example of FIGS. 22A and 22B. The magnetic sensor 2b is resin-molded in a ring-shaped metal case 39 and is fixed to the outer member 31 via the metal case 39. The other configuration is the same as in the example shown in FIGS. 15 and 16.

Figure 19:
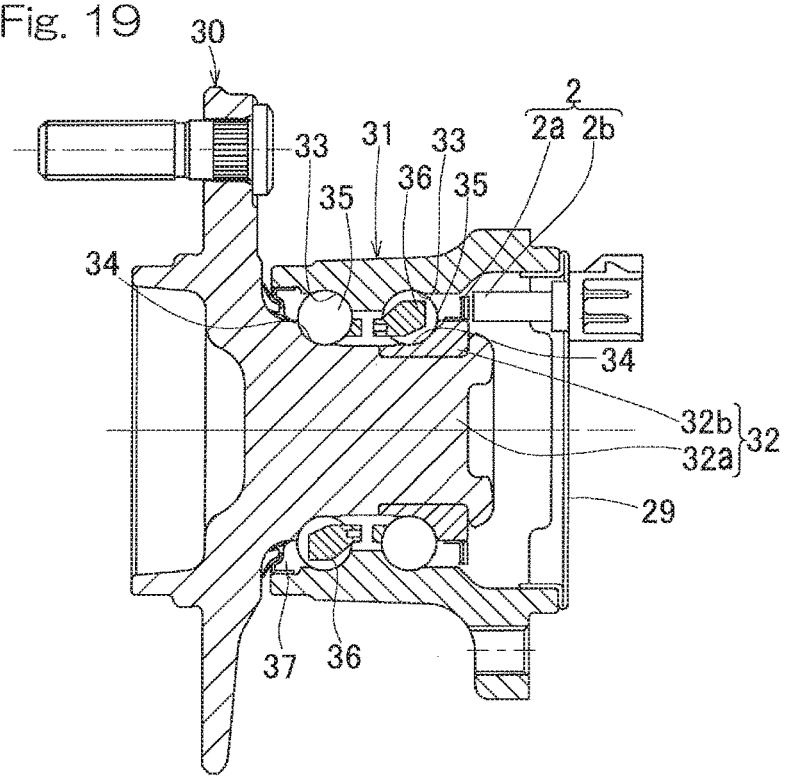
FIG. 19 is a cross-sectional view of still another example of the wheel bearing equipped with the rotation sensor used in the wear amount detection device.
Figure 20:
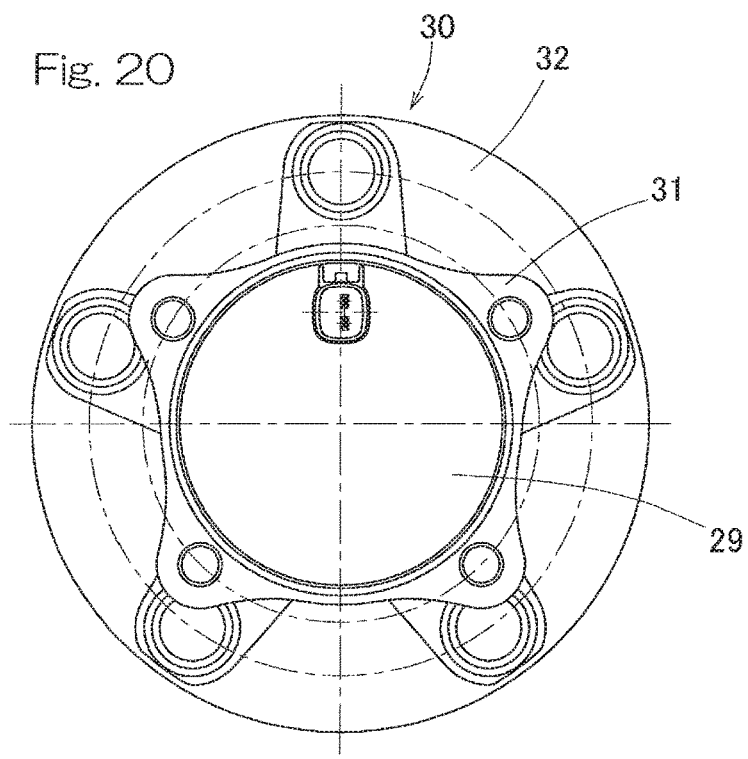
FIG. 20 is a view of the wheel bearing in FIG. 19 as seen from the inboard side.

A wheel bearing assembly 30 shown in FIGS. 19 and 20 is a third-generation inner ring rotating type and is for supporting a driven wheel, and an example is shown in which the rotation sensor 2 is provided at an inboard side end. In this example, an opening in an end surface of an inboard side end portion of the outer member 31 is covered with a cover 29, and the magnetic sensor 2b of the rotation sensor 2 is mounted on the cover 29. The other configuration and advantageous effects are the same as in the example shown in FIGS. 15 and 16.

The wear amount detection device for automobile tires according to the present invention is applicable to a wide range of automobiles including small-size automobiles, such as passenger cars and taxies, to large-size automobiles such as trucks, trailers, and buses.

A most preferred embodiment is application to large-size automobiles such as trucks, trailers, and buses.

These automobiles are required to safely and efficiently transport passengers or cargoes, and thus it is important to constantly keep the vehicle in a normal state. By monitoring a wear amount of each tire during running in addition to daily checking before service, it is necessary to recognize an indication of wear before the service is influenced.

REFERENCE NUMERALS

1 . . . wheel
1a . . . tire
2 . . . rotation sensor
3 . . . signal processing unit
4 . . . wear state determination unit
5 . . . wear amount detection device for automobile tires

What is claimed is:

1. A wear amount detection device for a tire of an automobile, the wear amount detection device detecting a wear amount of the tire, the wear amount detection device comprising:
   a rotation sensor configured to detect a rotation signal of a wheel so as to measure a speed of the automobile;
   a signal processing unit configured to extract rotation speed fluctuations synchronized with the rotation, from the rotation signal detected by the rotation sensor, and to obtain, from the extracted rotation speed fluctuations, rotation speed fluctuation patterns over a plurality of rotations, each of the rotation speed fluctuation patterns including a rotation speed fluctuation synchronized with the corresponding rotation; and
   a wear state determination unit configured to determine, in the obtained rotation speed fluctuation patterns, a component value induced by a characteristic embodied in the tire, the component value varying in accordance with a wear state of the tire, to estimate a wear state of the tire on the basis of the determined component value, and to output wear information,
   wherein the wear state determination unit includes a relationship set portion configured to set a relationship between progressive states of wear of the tire and component values induced by the characteristic embodied in the tire, the value varying in accordance with a wear state of the tire, and
   the characteristic includes at least one of the following characteristics (b), (c), (e), (h) and (i):
      (b) a characteristic in a form in which an area or a pattern thereof changes as wear progresses;
      (c) a characteristic that induces rotation speed fluctuations patterns which are different from each other depending on a wear amount;
      (e) a characteristic including at least one characteristic structure formed by a tread pattern of the tire in a direction traversing a tread, the feature structure varying with wear;
      (h) a characteristic configured such that the rotation speed fluctuation pattern changes to have a special fluctuation as wear progresses; and
      (i) a characteristic including at least one characteristic portion, the characteristic including a groove formed in the tread of the tire in an initial state, the groove having a depth which decreases as wear progresses.

2. The wear amount detection device as claimed in claim 1, wherein the characteristic further includes at least one of the following characteristics (a), (d), (f) and (g):
   (a) a characteristic in a specific portion in which a material is different from that of the other portions;
   (d) a characteristic that induces a special pattern having a specific fluctuation over one rotation;
   (f) a characteristic including a plurality of characteristic structures, the structures being formed at a plurality of positions in a rotation direction of the tire such that the intervals of the plurality of positions are not equal in the rotation direction; and
   (g) a characteristic including at least one characteristic portion in the tread, some of the materials forming the portion being different from the other portions of the tread.

3. The wear amount detection device as claimed in claim 1, wherein the signal processing unit obtains the rotation speed fluctuation patterns by performing an averaging process or an integration process synchronized with the rotation, on the rotation signal of the rotation sensor over a plurality of rotations.

4. The wear amount detection device as claimed in claim 1, wherein the signal processing unit obtains the rotation speed fluctuation patterns in a running speed range selected from one or more set running speed ranges.

5. The wear amount detection device as claimed in claim 1, wherein the signal processing unit obtains the rotation speed fluctuation patterns in each of a plurality of running speed ranges, and the wear state determination unit performs a wear state estimation process for each running speed range in which the signal processing unit performs the obtaining process, and determines a wear state as a whole on the basis of results of these estimation processes.

6. The wear amount detection device as claimed in claim 1, wherein a rotation sensor detects a zero phase, and the signal processing unit obtains a difference between the obtained rotation speed fluctuation patterns and reference patterns in a state where phase of the rotation speed fluctuation patterns are aligned with each other, and a wear state is determined on the basis of the difference.

7. The wear amount detection device as claimed in claim 1, wherein the rotation sensor includes:
a magnetic sensor;
a magnetic encoder or a pulsar gear having poles to be detected by the magnetic sensor; and
a multiplication circuit configured to output a rotation pulse obtained by multiplying a detection signal of the magnetic sensor.

8. The wear amount detection device as claimed in claim 1, wherein the wear state determination unit transforms the obtained rotation speed fluctuation patterns to rotation order components, and determines a wear state based on a level of a specific rotation order component indicative of a wear state.

9. The wear amount detection device as claimed in claim 8, wherein a magnitude of a rotation order component included in the obtained rotation speed fluctuation patterns is used as an evaluation value for determining the wear state, the magnitude of a rotation order component indicating the wear state.

10. The wear amount detection device as claimed in claim 1, further comprising a wear estimation result utilization module configured to issue a warning to a driver or change a control state of the vehicle on the basis of the wear information outputted from the wear state determination unit.

11. The wear amount detection device as claimed in claim 10, wherein the wear estimation result utilization module is configured to cause a warning notification device at a driver's seat to perform display on the basis of the wear information outputted from the wear state determination unit.

12. The wear amount detection device as claimed in claim 10, wherein the wear estimation result utilization module is configured to change a control parameter of a vehicle control computer on the basis of the wear information outputted from the wear state determination unit, and to perform safety control that takes performance of the tire into consideration.

13. The wear amount detection device as claimed in claim 10, wherein the wear estimation result utilization module is configured to issue a warning in a specific weather on the basis of a weather during running and the wear information outputted from the wear state determination unit.

14. The wear amount detection device as claimed in claim 10, wherein the wear estimation result utilization module is configured to cause a computer mounted on the vehicle to transmit the wear information outputted from the wear state determination unit, via a communication line to a terminal at a determined business place where checking of the vehicle or replacement of the tire is possible.

* * * * *